March 30, 1926.
F. H. STANWOOD
1,578,864
FOOT SCRAPER FOR AUTOMOBILE RUNNING BOARD TREADS
Filed March 6, 1924    2 Sheets-Sheet 1
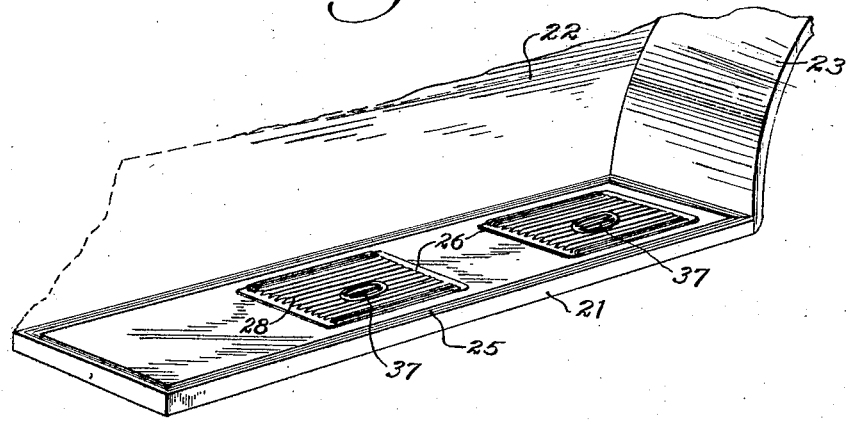
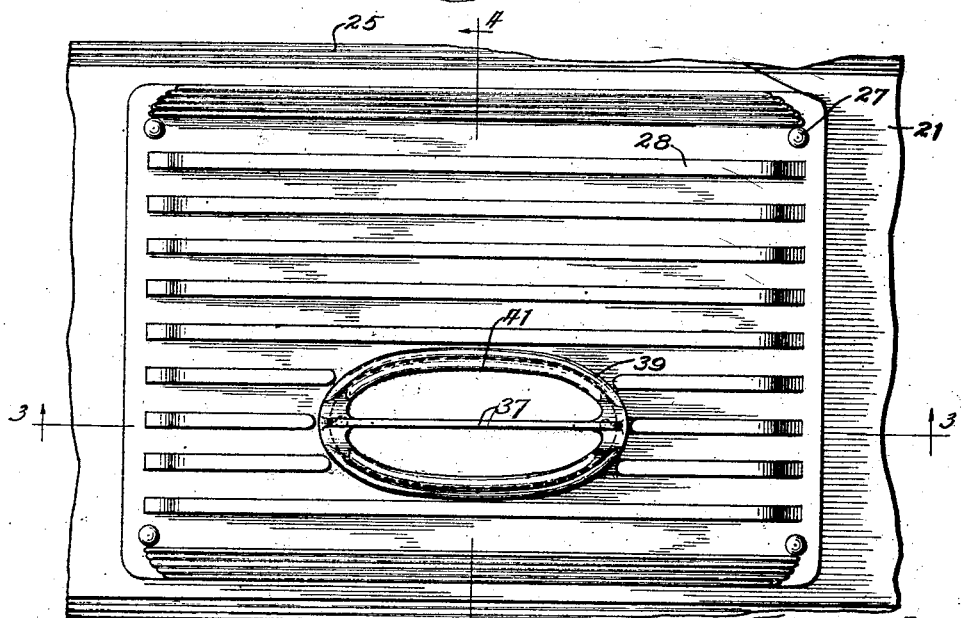
Inventor:
Frank H. Stanwood,
By Munday, Clarke & Carpenter

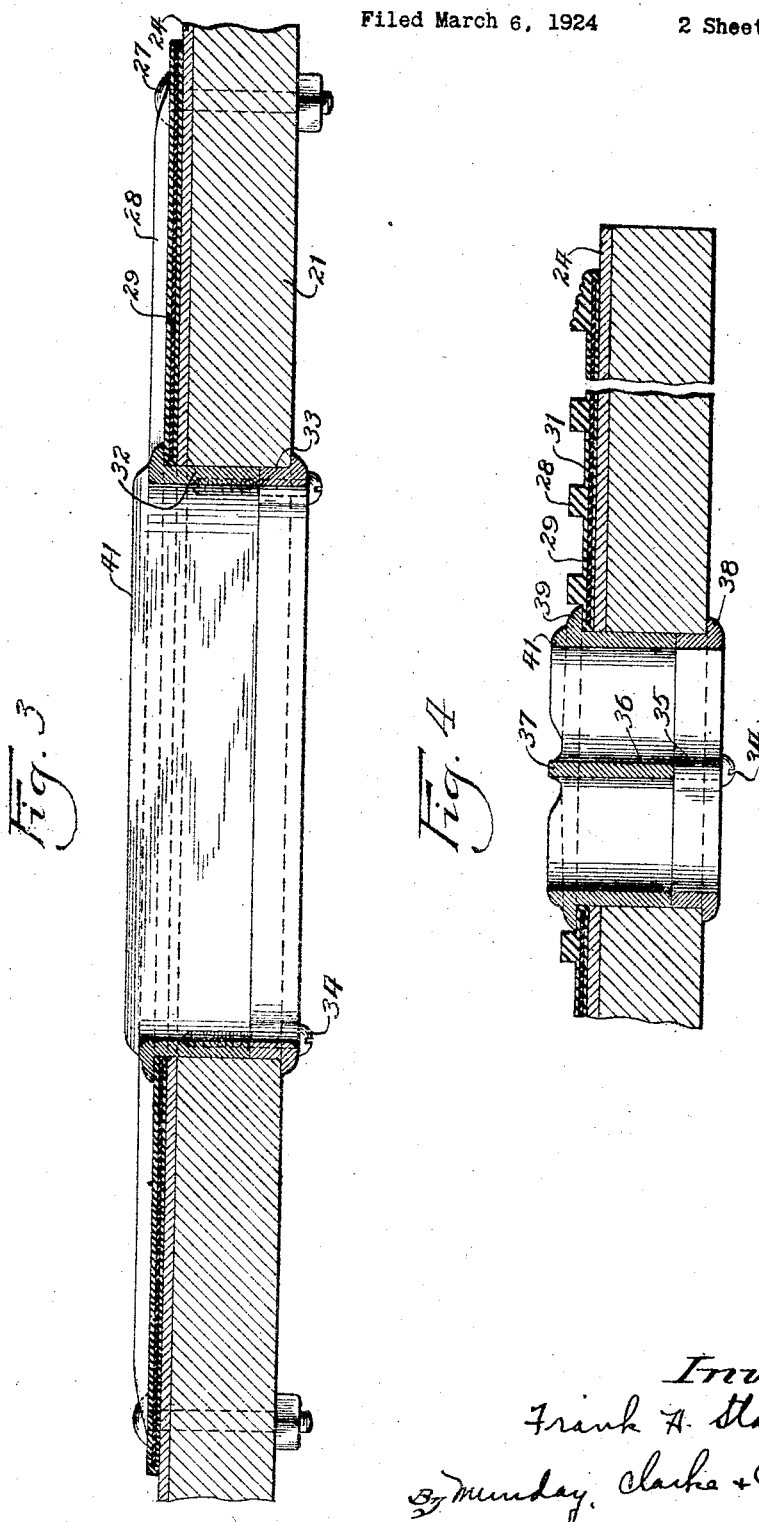

Patented Mar. 30, 1926.

1,578,864

UNITED STATES PATENT OFFICE.

FRANK H. STANWOOD, OF WILMETTE, ILLINOIS, ASSIGNOR TO STANWOOD EQUIPMENT COMPANY, OF CHICAGO, ILLINOIS, A CORPORATION OF ILLINOIS.

FOOT SCRAPER FOR AUTOMOBILE RUNNING-BOARD TREADS.

Application filed March 6, 1924. Serial No. 697,177.

*To all whom it may concern:*

Be it known that I, FRANK H. STANWOOD, a citizen of the United States, residing in Wilmette, in the county of Cook and State of Illinois, have invented a new and useful Improvement in Foot Scrapers for Automobile Running-Board Treads, of which the following is a specification.

This invention relates to a foot scraper insert for step treads used upon automobile running boards and the like and has for a principal object the provision of a conveniently positioned and efficient device of this character.

An important object of the invention is the provision of a foot scraper adapted to be incorporated in the body of a running board step tread and having such form and arrangement that the dirt may fall directly through the running board beneath the scraper.

A further object of the invention is the provision of a step tread scraper insert of pleasing appearance adapted to contribute to the ornamental effect of the tread design.

Another object is the provision of a device of this character which will be strong and durable and which will protect the wall of the opening through the step tread and running board provided therefor.

Numerous other objects and advantages of the invention will be apparent as it is better understood from the following description, which, taken in connection with the accompanying drawings, discloses a preferred embodiment thereof.

Referring to the drawings,

Figure 1 is a perspective view of an automobile running board provided with step treads and scraper inserts in accordance with my invention, portions of the body and fender of the car being shown diagrammatically.

Fig. 2 is a top plan view of a step tread positioned upon the running board and provided with a scraper embodying the principles of my invention;

Fig. 3 is an enlarged section taken substantially on the line 3—3 in Fig. 2; and Fig. 4 is a similar section taken substantially on the line 4—4 in Fig. 2.

The running board 21 may be of any usual or preferred form and is secured to the body 22 and fender 23 of the car in any suitable manner. It is preferably provided with a cover 24 and edging 25 and has step treads 26 secured thereto beneath the doors by means of bolts 27 extending through the running board and disposed at the corners of the treads.

Said treads are preferably provided with upstanding isolated ribs 28 and, in the present instance, are formed with a metal plate 29 incorporated in a rubber body 31 which may be secured to said metal plate by vulcanization, or any other desired manner.

The scraper comprises separable sections 32 and 33 adapted to be drawn together by means of screws 34 extending through the boss 35 in the bottom section and into enlarged end portions 36 of a longitudinal rib 37 in the upper section. The bottom section 33 is provided with a horizontal flange 38 and the upper section 32 is provided with a similar flange 39, said flanges being adapted to be clamped respectively against the bottom of the running board and the top of the step tread when the screws 34 are tightened. Aligned openings in the tread and running board are provided for the reception of the scraper device and the walls thereof, as well as the edges of the tread adjacent the opening therein, are protected by the metal parts just described. The inner longitudinal edges of the upper section 32 are formed with upstanding ridges 41, which, together with the rib 37, provide the scraper elements.

The position of the scraper thus provided is such that it is readily accessible and usable by a person entering the car without changing his natural position and as the dirt may fall directly through the openings in the tread and running board, there will be no appreciable accumulation between the ribs of said treads.

It is thought that the invention any many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A foot scraper insert for automobile running board step treads, comprising a two-part hollow member adapted to be positioned in an opening in the tread and running board and providing flanges for engaging respectively the top of the tread and the bottom of the running board, said member being formed with an upstanding scraper edge.

2. A foot scraper insert for automobile running board step treads, comprising a two-part hollow member adapted to be positioned in an opening in the tread and running board and providing flanges for engaging respectively the top of the tread and the bottom of the running board, said member being formed with a central web providing an upstanding scraper edge.

3. A foot scraper insert for automobile running board step treads, comprising separate flanged members adapted to be disposed within an opening in the tread and running board, means for drawing said members together to clamp the flanges thereof against the tread and running board, respectively, and foot scraping means upon the upper member.

FRANK H. STANWOOD.